No. 833,985. PATENTED OCT. 23, 1906.
T. W. THOMAS & G. W. GILLETTE.
AUTOMATIC CHANGEABLE SIGN.
APPLICATION FILED NOV. 23, 1905.
4 SHEETS—SHEET 3.
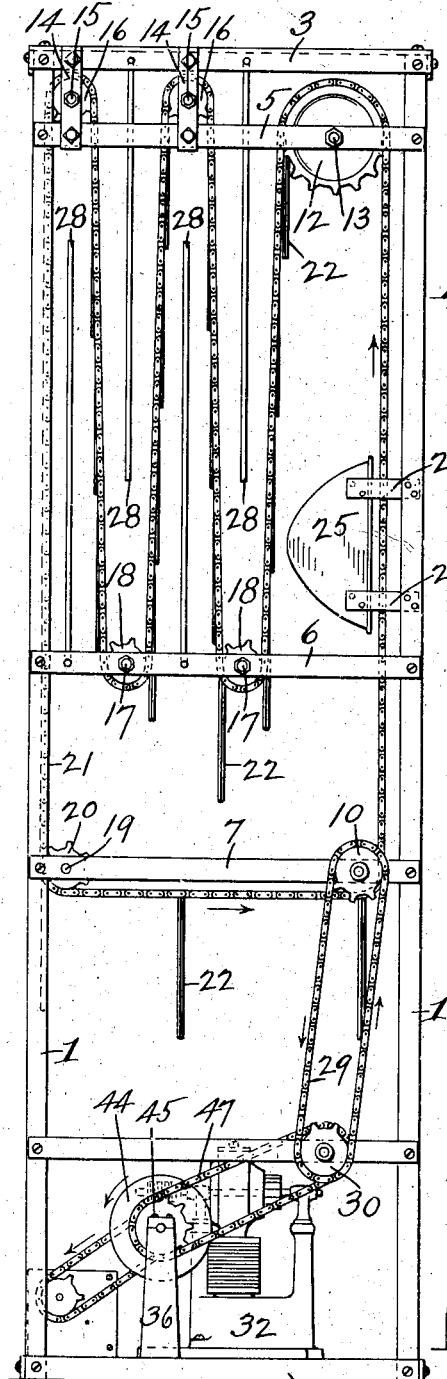
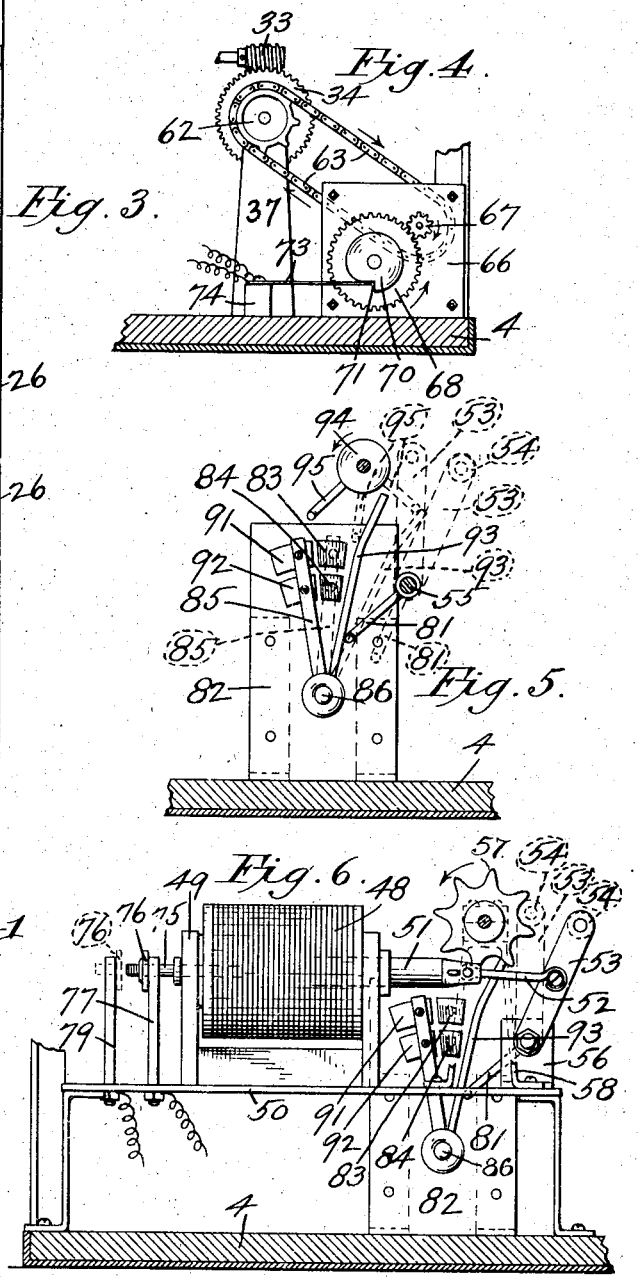
Witnesses:
A. L. Lord.
E. J. Robinson.
Inventors
Thomas W. Thomas
George W. Gillette
by Cramer & Chapman
Attorneys.

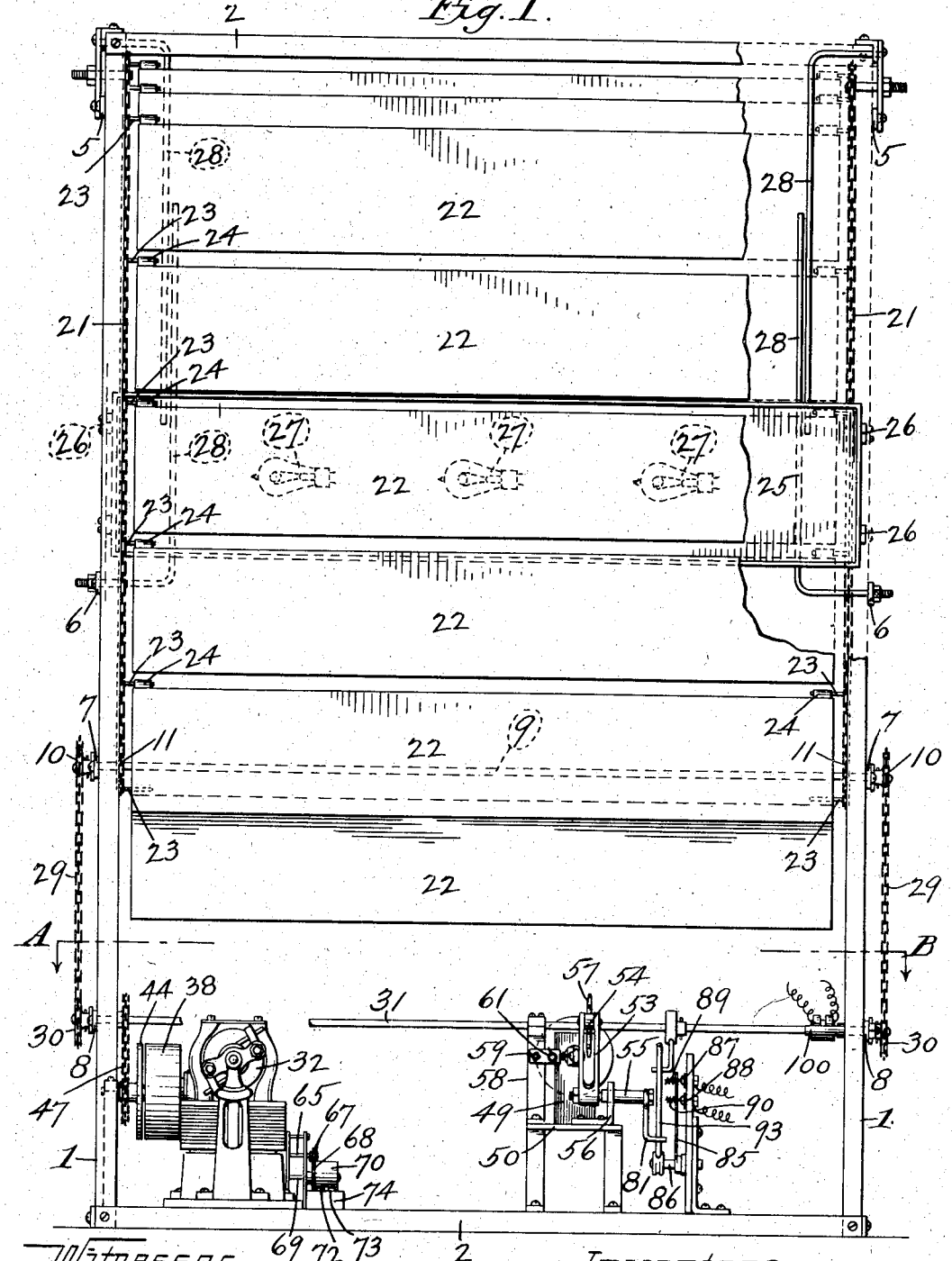

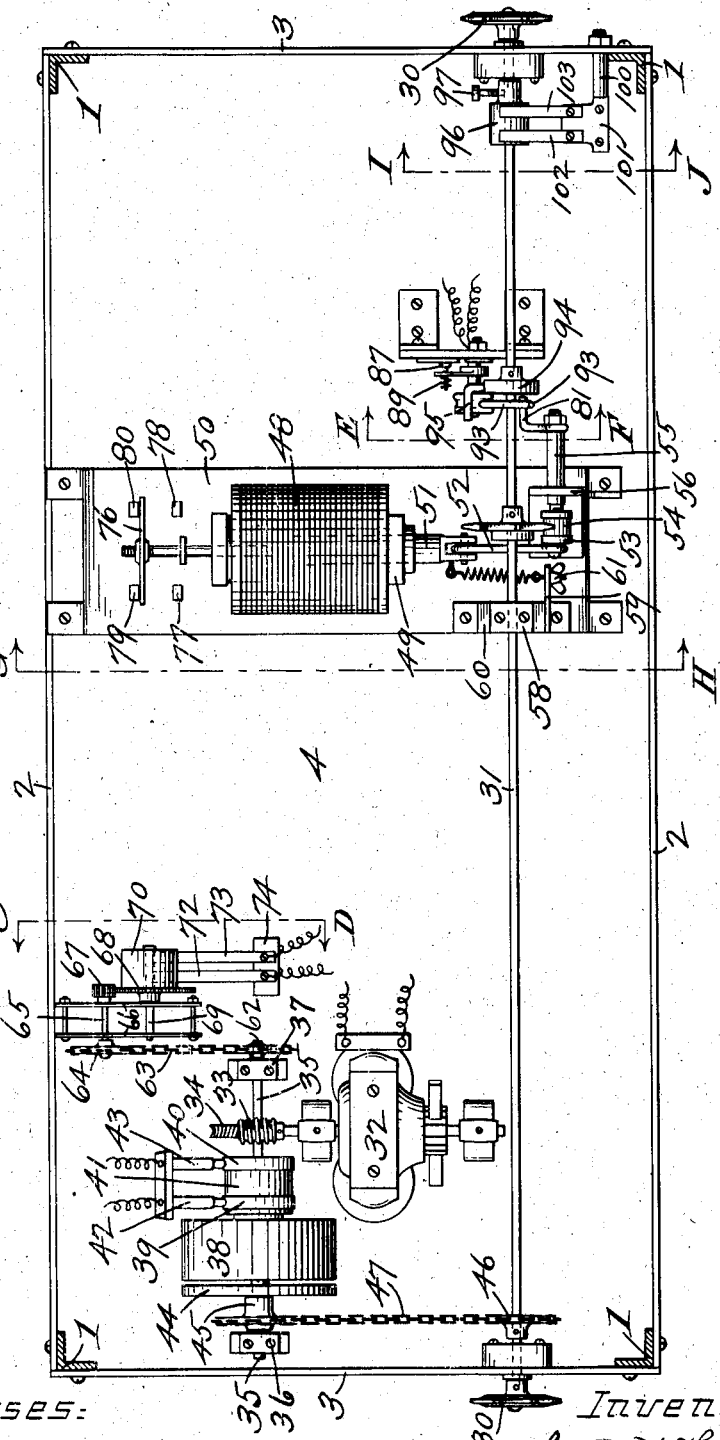

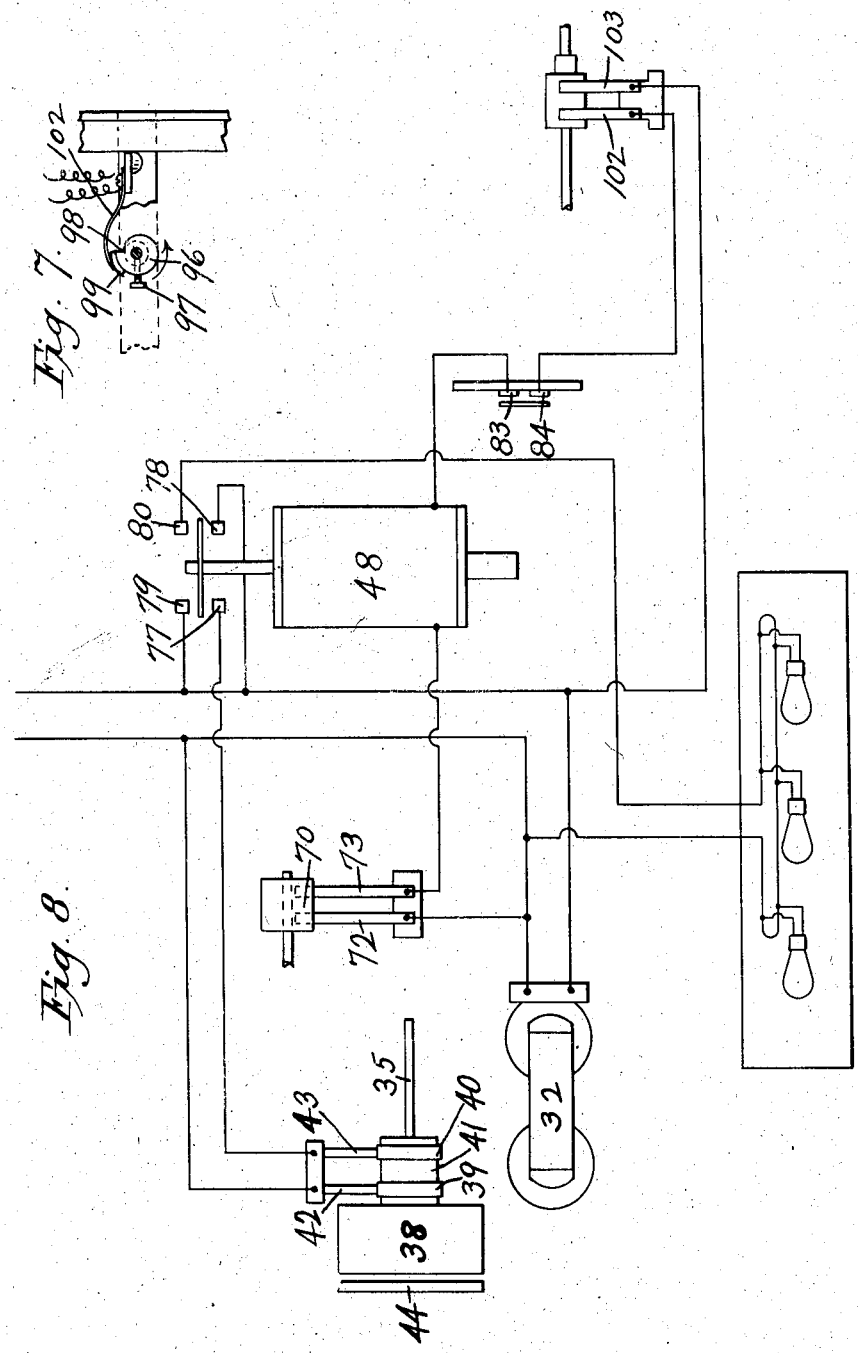

UNITED STATES PATENT OFFICE.

THOMAS W. THOMAS AND GEORGE W. GILLETTE, OF CLEVELAND, OHIO, ASSIGNORS OF ONE-HALF TO SHERIDAN RISLEY, OF CLEVELAND, OHIO.

AUTOMATIC CHANGEABLE SIGN.

No. 833,985.   Specification of Letters Patent.   Patented Oct. 23, 1906.

Application filed November 23, 1905. Serial No. 288,775.

*To all whom it may concern:*

Be it known that we, THOMAS W. THOMAS and GEORGE W. GILLETTE, citizens of the United States, residing at Cleveland, in the county of Cuyahoga and State of Ohio, have invented certain new and useful Improvements in Automatic Changeable Signs, of which the following is a specification.

Our invention in general relates to improvements in traveling advertising-signs in which the signs continuously and automatically change, and more especially relates to and is an improvement and simplification of our invention of a similar device as disclosed in our application, filed May 18, 1905, Serial No. 260,969.

The object of our invention is to provide a device having an unlimited number of display sections or signs and means for suspending these sections in a conveniently small space and for allowing them to be carried into display position and to provide an operating mechanism in conjunction therewith to cause said display sections or signs automatically to travel into and stop in display position consecutively. We accomplish this with the novel arrangement and construction of parts hereinafter described, illustrated in the accompanying drawings, and pointed out in the claims appended hereto.

In the accompanying drawings, Figure 1 is a front elevation with a portion of the front broken away, showing the sign-carrier, the partition-bars, and the operating mechanism underneath. Fig. 2 is a plan view of the operating mechanism, the top of the machine being removed along the line A B, Fig. 1, showing the motor, magnetic clutch, magnetic brake, and the electric switches or controllers. Fig. 3 is a side elevation showing the general arrangement of the sign-carrier and the operating mechanism in driving connection therewith. Fig. 4 is a detail sectional elevation along the line C D, Fig. 2, showing the automatic switch for the magnetic brake. Fig. 5 is a detail sectional elevation along the line E F, Fig. 2, showing the automatic switch operated by the combined movements of the brake and main shaft for opening and closing the magnetic-brake-coil circuit. Fig. 6 is a detail sectional elevation along the line G H, Fig. 2, showing the magnetic-brake mechanism. Fig. 7 is a detail sectional elevation along the line I J, Fig. 2, showing the supplementary switch for regulating the action of the magnetic brake. Fig. 8 is a diagrammatic view showing the wiring connecting the various parts in operation.

Similar figures refer to similar parts throughout the various views.

As we have constructed our invention the framework consists of four similar upright angle-bars 1, four similar horizontal bars 2, and four similar horizontal bars 3, fastened together, as shown, to form a rectangular frame. Secured to the bottom of the frame is the wooden platform or base 4, and at each side, connecting the upright angle-bars 1 1, are secured pairs of horizontal cross-bars 5, 6, 7, and 8. The shaft 9 extends through and turns in suitable bearings in the horizontal bars 7 7 and carries, secured to and turning with it, the pair of sprockets 10 10 outside the frame and a pair of sprockets 11 11 on each side within the frame. The sprocket 12, Fig. 3, turns on the stud 13, secured to the horizontal bar 5, as shown, the inner end of said stud being countersunk into said sprocket, and a similar sprocket is similarly secured on the opposite side of the frame. To the cross-bars 14, extending between the horizontals 3 and 5, are secured the studs 15, on which turn the sprockets 16, the ends of said studs being countersunk into said sprockets. Similar sprockets are similarly secured to correspond thereto on the opposite side of the frame.

To the horizontal cross-bar 6 are secured the studs 17 17, on which turn the sprockets 18 18, the ends of the studs being countersunk into the sprockets, and similar sprockets are similarly secured to correspond thereto on the opposite side of the frame. The sprocket 20 turns on the stud 19, secured to the horizontal 7, and a similar sprocket is similarly secured on the opposite side of the frame.

A pair of endless chains 21 21 of equal length run over these pairs of sprockets, as shown. Thus it will be seen that power applied to the sprockets 10 10 will cause these chains to travel over the various pairs of sprockets in unison.

A series of display sections or signs 22 are suspended between the endless chains 21 21 in the following manner: At equal intervals in said chains, the intervals depending on and equaling the height of the display sections or signs, the rivets are removed, and the pins or pivots 23 are inserted in their place. To the top and at each side of each display section or sign are secured small cylinders 24, into which said pins or pivots 23 slide. As thus suspended the display sections or signs always remain in a perpendicular position and travel with the chains around the sprockets without binding and with minimum friction.
The display sections or signs may be made of any suitable material and may be either transparent or opaque. If transparent, they can be illuminated when in display position by a reflector-box 25, containing the lamps 27, which box is supported by the brackets 26, extending from the front upright frame-bars 1 1, as indicated.
As thus constructed the display sections or signs, being hinged or pivoted to the chains, are liable to swing slightly when moving quickly over the sprockets, and to prevent them from swinging into each other and catching when traveling over the sprockets it is necessary to have some sort of partitions between them as they pass each other, and we prefer to accomplish this with the bars 28, which are rigidly secured to the horizontal frames 3 and 6 and are bent, as shown, so as to extend between the folds of display sections or signs formed in traveling around the sprockets.
Power is applied to the sign-carrier as thus described from a main shaft 31, extending between and turning in suitable bearings secured to the horizontal bars of the frame 8 8 by means of the chains 29 29, which run over the sprockets 10 10 on the shaft 9 and the sprockets 30 30, secured to the said shaft 31, and around this main shaft 31 is assembled the operating mechanism. Power is secured from an electric motor 32, which may be of any suitable construction, secured to the base 4. To the driving-shaft of the said motor is secured a worm-gear 33, which meshes into the gear 34, secured to a shaft 35, which is supported by and turns in suitable bearings in the standards 36 and 37, resting on the base 4.
When the machine is in operation, the motor is constantly running, and consequently the shaft 35 is constantly turning, and power is intermittently applied from the shaft 35 to the main shaft 31 by means of an electric clutch consisting of a magnet-coil contained in a suitable frame 38, two brass rings 39 and 40, connected each with an end of said coil and fastened on an insulating-cylinder 41, said magnet-coil and insulating-cylinder being rigidly secured to the constantly-turning shaft 35, and two brushes 42 and 43, suitably insulated from each other and suspended to make contact one with each of said rings and an iron disk or armature 44, which is secured on the shaft 35 loosely, so as to be free to turn thereon. As thus constructed it will be readily seen that the shaft 35 and magnet-coil 38 may revolve continuously; but the armature 44 will revolve only when the magnet-coil is energized. To this armature 44 is fastened the sprocket 45, over which runs the chain 47 to the sprocket 46 on the main shaft 31, so that it is apparent that the main shaft 31 turns, and through it the sign-carrier is caused to travel only when the magnet-coil of the clutch is energized.
The movement of the carrier is arrested and the sign being shown held in display position by means of a magnetic brake operating on the main shaft 31, as shown in detail in Figs. 1, 2, and 6. A magnet-coil 48, contained in a suitable yoke or frame 49, which rests on a suitable table or base 50, elevated from the base 4, has a plunger 51 sliding within said coil, which plunger is connected by the rod 52 with the lever 53, which lever has the roller 54 at the top and is secured at the bottom to the shaft 55, which is supported by and turns in the bracket 56, resting on the table 50. The main shaft 31 has secured to it the indented brake-wheel 57, into the indentations of which fits the roller 54 on the lever 53. It is preferable to have a standard or support 58 resting on the table 50, suitably journaled around the main shaft 31 for the purpose of giving said shaft stability, and secured to this standard is the bracket 59, extending between which and the plunger 51 is a spiral spring 60, which pulls the plunger out, and thus releases the lever holding the brake-wheel when the magnet-coil is inert. This spring preferably has at one end a threaded nut and screw 61 to adjust the tension of the spring. It is thus readily seen that when the magnet-coil is energized the plunger is drawn in, and the lever is consequently pulled against the brake-wheel, holding the main shaft 31 stationary, and through it the sign-carrier, and when the magnet is inert the spring releases the lever from the brake-wheel and allows the said shaft to turn, and through it the sign-carrier to travel.
The action of the magnetic clutch and the magnetic brake is controlled in this machine as we have constructed it by a combination of four automatic switches or controllers. To the shaft 35 of the magnetic clutch, which is constantly turning when the machine is in operation, is secured the sprocket 62, Fig. 4, over which runs the chain 63 to and over a sprocket 64, Fig. 2, secured to a shaft 65, which is supported and turns in suitable bearings in a frame 66. Secured to this shaft and turning with it is a small gear 67, which meshes into a large gear 68, attached to a shaft 69, turning in suitable bearings in the frame 66. To this shaft a cylinder 70, of any suitable non-conducting material, is attached. This cylinder has in its outer surface an offset or recess 71, and excepting the surface of the said offset or recess the rest of the surface of the cylinder is covered with a sheeting of suitable electrically-conducting material. Two spring-brushes 72 and 73, which are inserted in the magnetic-brake-coil circuit, are mounted on an insulating-block 74 in such manner as to make continuous rubbing contact with the said cylinder 70. It will be apparent that as the cylinder rotates the circuit will be continuous through the brushes 72 and 73 and the conductive sheeting of the cylinder, but that when the brushes make contact with the uncovered offset or recess in the cylinder the circuit will be broken.

The circuit through the clutch-coil is completed, thus starting the carrier to travel, by means of a switch operated by the movement of the plunger of the magnetic brake in releasing the brake-lever. To the end of the plunger 51 within the coil is secured a rod 75, extending through the rear of the yoke of the magnet-coil, and this rod carries a cross-bar 76, which is adjustable on said rod by means of nuts on either side thereof. A pair of posts 77 and 78 are inserted in the clutch-coil circuit, being suitably insulated and supported on the table or base 50 and so arranged that the cross-bar 76 will connect each with the other when the plunger 51 is pulled out by the spring 60. Thus it will be readily seen that when the circuit through the magnetic-brake coil is broken the lever holding the main shaft 31 stationary is released, and by the same movement the circuit through the magnetic clutch is completed and the said main shaft started to rotate.

A pair of posts 79 and 80 are inserted in the lighting-circuit, being suitably insulated and supported on the table or base 50 and so arranged that the cross-bar 76 will connect each with the other when the plunger 51 is drawn in by the energizing of the magnet-coil, thus completing the lighting-circuit when the carrier is at rest, and of course the said circuit would be broken when the plunger is pulled out by the spring.

It will be seen that the circuit through the brake-coil will be broken but momentarily and closed again by the continuous turning of the recessed cylinder 70, and to keep this circuit broken until the sign-carrier shall have traveled into proper position we have constructed the switch shown in detail in Fig. 5, which is operated by the combined movements of the brake-lever and the main shaft. To the lever-shaft 55, Fig. 2, is secured the bent arm 81, which takes the two positions shown with the movement of the lever 53. To the base 4 is secured a supporting-board 82, to which are secured two terminals or contact-plates 83 and 84, which are inserted in the brake-coil circuit. The switch-arm 85, secured to a shaft 86, Fig. 1, supported in the board 82, carries two contact-buttons 87 and 88, which we prefer to mount on small pins extending through the switch-arm 85 and having small spiral springs 89 and 90 to hold the buttons against the contact-plates, the ends of said pins being connected by any suitable conductive material. Fiber plates 91 and 92 are mounted on the board 82 flush with the contact-plates to prevent the contact-buttons from catching. A lever 93 is secured to the shaft 86, and the main shaft 31 carries secured to it the wheel 94, having a projecting bent arm 95, so arranged that when the shaft turns the lever 93 will be in the path of the said projecting arm. It will thus be seen that when the plunger of the magnetic brake is pulled out by the spring the brake-lever through the arm 81 will push the lever 93, attached to the switch-arm, and thereby open the switch, which will remain open until the arm 95, revolving with the main shaft, catches the said switch-arm lever 93 and closes the switch.

As thus constructed the machine could be operated with the switches or controllers already described; but it would require very careful adjustment of the switch operated by the brake-lever and main shaft to cause the brake to arrest the carrier at just the right moment, and we prefer to provide a supplementary switch or controller to accomplish this purpose, which switch is assembled around and operated by the main shaft. To the main shaft 31 a fiber cylinder 96 is secured by a screw 97, which allows it to be adjusted to any position on the shaft. This cylinder has a recess 98 in its surface and has secured to it at the edge of said recess a conductive plate 99. Supported on a bracket 100, secured to the frame of the sign, as shown, and insulated therefrom and from each other by a fiber plate 101, are two spring-brushes 102 and 103, which make continuous contact with the cylinder on the main shaft and are inserted in the brake-coil circuit. It will thus be seen that as the main shaft 31 rotates the brake-coil circuit will be completed only when these brushes are in contact with the conductive plate 99 on the fiber cylinder 96, and by adjusting the position of said cylinder on the shaft by means of the screw 97 the brake-coil circuit can be made to close at the desired moment.

The wiring is shown in Fig. 8.

When the sign is in operation, the motor is of course constantly running, and the conductive sheeted cylinder 70 is likewise constantly turning. When the said cylinder revolves so as to break the brake-coil circuit between the brushes 72 and 73, the plunger of the brake is pulled out by the spring attached to it, thus releasing the lever from the brake-wheel, and by this one movement the clutch-coil circuit is completed between the posts 77 and 78, thus energizing the clutch-coil, thereby causing the main shaft to turn, and through it the sign-carrier to travel. The lighting-circuit is broken between the posts 79 and 80, and through the brake-lever the switch is operated, opening the brake-coil circuit between the contact-plates 83 and 84. The turning of the main shaft breaks the brake-coil circuit between the brushes 102 and 103. The constantly-turning cylinder closes the brake-coil circuit between the brushes 72 and 73 shortly after it breaks it; but the circuit remains open between the contact-plates 83 and 84 until the projecting arm, revolving with the main shaft, catches the switch-arm lever and closes the switch. The circuit remains broken between the brushes 102 and 103 until the main shaft turns sufficiently to bring the conductive plate on the fiber cylinder turning with the main shaft in contact with said brushes, when the circuit is completed through the brake-coil and the plunger of the brake is drawn in, thus arresting the main shaft by means of the brake-wheel and lever. The movement of the plunger breaks the clutch-coil circuit between the posts 77 and 78 and completes the lighting-circuit between the posts 79 and 80. The magnetic brake holds the main shaft, and through it the sign-carrier, stationary until the brake-coil circuit is broken again by the constantly-turning cylinder, when the same operation is repeated.

Having thus fully described the construction and operation of our invention, what we claim as new, and desire to protect by Letters Patent, is—

1. In a changeable sign, the combination of a pair of endless chains, display sections or signs suspended between said chains, and means for containing numerous display sections or signs in small space, comprising series of pairs of sprockets over which the said endless chains run, and partitions extending between the folds of display sections or signs, for preventing the display sections or signs from interfering with each other; substantially as described.

2. In a changeable sign, the combination of a pair of endless chains, display sections or signs, cylinders or sockets secured to the top of the said display sections or signs, pins or pivots secured to the endless chains and fitting into the said cylinders or sockets on the display sections or signs, and means for containing numerous display sections or signs in small space, comprising two series of pairs of sprockets over which the said endless chains run alternately from one series to the other, and partitions extending between the folds of display sections or signs thus formed, for preventing the display sections or signs from interfering with each other; substantially as described.

3. In a changeable sign, a sign-carrier, a main shaft in driving connection therewith, a constantly-rotating shaft, a magnet-coil secured to and turning with said constantly-rotating shaft, means for energizing said magnet-coil, comprising insulated rings connected with the ends of said coil and turning with it and brushes suitably suspended to make contact with said rings, and an armature mounted to revolve independently of the constantly-rotating shaft, in driving connection with the main shaft; substantially as described.

4. In a changeable sign, a sign-carrier, a main shaft in driving connection therewith, an indented brake-wheel secured to the said shaft, a lever fitting into the indentations of the said brake-wheel, a magnet-coil, a plunger sliding within the said magnet-coil and connected with the said lever, and a spring to pull out the plunger and release the lever; substantially as described.

5. In a changeable sign, a sign-carrier, a main shaft in driving connection therewith, a constantly-rotating shaft, a magnetic-clutch mechanism for transmitting intermittent motion from the constantly-rotating shaft to the main shaft, a magnetic-brake mechanism for arresting the movement of the main shaft, a magnetic-clutch circuit, a pair of contact-posts inserted in the said circuit, and a movable connecting-bar operated by the movement of the magnetic brake; substantially as described.

6. In a changeable sign, a sign-carrier, a main shaft in driving connection therewith, a constantly-rotating shaft, means for intermittently imparting motion from the constantly-rotating shaft to the main shaft including a constantly-turning magnet-coil and an independently-mounted armature, and means for arresting the motion of the main shaft including a magnet-coil and plunger sliding therein; substantially as described.

7. In a changeable sign, a sign-carrier, a main shaft in driving connection therewith, means for arresting the movement of the main shaft including a magnet-coil, a plunger sliding therein, and an electric circuit through the magnet-coil, and means for breaking the circuit through the said magnet-coil, comprising a constantly-rotating cylinder, said cylinder having a portion of its surface electrically conductive and a portion non-conductive, and a pair of brushes inserted in the magnet-coil circuit and suspended to make continuous contact with the surface of the said cylinder as it rotates; substantially as described.

8. In a changeable sign, a sign-carrier, a main shaft in driving connection therewith, a constantly-rotating shaft, a magnetic-clutch mechanism for imparting intermittent motion from the constantly-rotating shaft to the main shaft, including a magnet-coil and an armature mounted to revolve independently of each other, and an electric circuit through the magnet-coil, a magnetic brake for arresting the motion of the main shaft, including a magnet-coil, a plunger sliding therein, a rod attached to the end of the plunger within the coil and extending through the rear end of the coil, and an electric circuit through the magnet-coil, and means for controlling the clutch and brake, comprising a cylinder in driving connection with the constantly-rotating shaft, said cylinder having its surface electrically conductive and having a longitudinal section of said surface non-conductive or insulated, and a pair of brushes inserted in the brake-coil circuit suspended to make continuous contact with the surface of the cylinder, a pair of posts inserted in the clutch-coil circuit, and a connecting-bar on the rod secured to the brake-plunger to connect and disconnect the said posts with each other with the movement of the brake-plunger; substantially as described.

9. In a changeable sign, a sign-carrier, a main shaft in driving connection therewith, means for arresting the movement of the main shaft including a magnet-coil, a plunger sliding therein and an electric circuit through the magnet-coil, and an automatic switch, comprising two suitably-insulated contact plates or terminals inserted in the magnet-coil circuit, a movable switch-arm in rubbing contact with the contact-plates, a projecting arm connected with the plunger for opening the switch, and a projecting arm secured to the main shaft for closing the switch; substantially as described.

10. In a changeable sign, a sign-carrier, a main shaft in driving connection therewith, a magnetic brake for arresting the motion of the main shaft, comprising a magnet-coil, a plunger sliding therein, a spring for counteracting the force of the magnet, a lever connected with the plunger and a toothed brake-wheel secured to the main shaft, and an automatic switch, comprising contact-plates inserted in the brake-coil circuit, a lever attached to the switch-arm, a projecting arm attached to the brake-lever to move the switch-arm lever for opening the switch, and a projecting arm secured to the main shaft to move the switch-arm lever for closing the switch; substantially as described.

11. In a changeable sign, a sign-carrier, a main shaft in driving connection therewith, a constantly-rotating shaft, means for arresting the motion of the main shaft, including a magnet-coil, a plunger sliding therein, a lever connected with the plunger and an electric circuit through the magnet-coil, and means for opening and closing the circuit through the magnet-coil, comprising a cylinder in driving connection with the constantly-rotating shaft, said cylinder having a longitudinal section of its periphery non-conductive and the balance conductive, a pair of brushes inserted in the magnet-coil circuit and arranged to make continuous rubbing contact with the said cylinder, and an automatic switch consisting of a pair of contact-plates inserted in the magnet-coil circuit, a switch-arm arranged to connect and disconnect the contact-plates by its movement, a projecting arm attached to the brake-lever for moving the switch-arm to disconnect the contact-plates, and a projecting arm secured to the main shaft for moving the switch-arm to connect the contact-plates; substantially as described.

12. In a changeable sign, a sign-carrier, a main shaft in driving connection therewith, a constantly-rotating shaft, a magnetic clutch for intermittently transmitting power from the constantly-rotating shaft to the main shaft, including a magnet-coil and an armature mounted to revolve independently of each other and an electric circuit through the magnet-coil, a magnetic brake for arresting the movement of the main shaft, including a magnet-coil, a plunger sliding therein, a brake-lever connected with the plunger and an electric circuit through the magnet-coil, a circuit-breaker for the brake-magnet-coil circuit, consisting of a cylinder in driving connection with the constantly-rotating shaft, said cylinder having a longitudinal section of its periphery non-conductive and the balance conductive, and a pair of brushes inserted in the brake-magnet-coil circuit and arranged to make continuous rubbing contact with the periphery of the cylinder, a switch for opening and closing the circuit through the clutch-magnet coil, comprising a pair of posts inserted in the said circuit, a rod secured to the inner end of the magnetic-brake plunger and extending through the rear end of the magnet-coil, an adjustable cross-bar secured to the said rod and arranged to connect and disconnect the posts with each other with the movement of the plunger, and a switch for opening and closing the brake-coil circuit, comprising an arm attached to the brake-lever, an arm secured to and turning with the main shaft, a lever in the path of both the said arms, a switch-arm secured to and moving with this lever, and two contact-plates inserted in the brake-coil circuit, arranged so that the movement of the switch-arm will connect and disconnect them; substantially as described.

13. In a changeable sign, a sign-carrier, a main shaft in driving connection therewith, means for arresting the movement of the main shaft, including a magnet-coil, a plunger and an electric circuit through the magnet-coil, and a switch or controller for opening and closing the said circuit, comprising a cylinder of suitable non-conducting substance arranged to turn freely on the main shaft, a screw for holding the cylinder fast to the shaft in any position, a strip of suitable conductive substance secured to the surface of the cylinder longitudinally, and a pair of brushes inserted in the magnet-coil circuit and arranged to make continuous contact with the surface of the cylinder as it rotates with the main shaft; substantially as described.

14. In a changeable sign, a sign-carrier, a main shaft in driving connection therewith, a constantly-rotating shaft, a magnetic brake operating on the main shaft, including a magnet-coil, a plunger and a circuit through the magnet-coil, and means for opening and closing the said circuit, comprising a cylinder in driving connection with the constantly-rotating shaft, said cylinder having a longitudinal section of its surface non-conductive and the balance conductive, a pair of brushes inserted in the magnet-coil circuit and arranged to make continuous contact with the cylinder, a cylinder of suitable non-conductive substance secured to and adjustable on the main shaft, a strip of suitable conductive substance secured on the surface of the said cylinder longitudinally, and a pair of brushes inserted in the magnet-coil circuit and arranged to make continuous contact with the said cylinder; substantially as described.

15. In a changeable sign, a sign-carrier, a main shaft in driving connection therewith, a contsantly-rotating shaft, a magnetic-clutch mechanism, including a magnet-coil and an armature mounted to revolve independently of each other, and an electric circuit through the magnet-coil, a magnetic-brake mechanism, including a magnet-coil, a plunger sliding therein and an electric circuit through the magnet-coil, means for opening and closing the clutch-coil circuit, comprising a pair of contact-posts inserted in the clutch-coil circuit, a rod secured to the inner end of the brake-plunger and extending through the rear of the magnet-coil, and a connecting-bar adjustably secured to the said rod and arranged to connect and disconnect the said posts with each other, and means for opening and closing the brake-coil circuit, comprising a cylinder in driving connection with the constantly-rotating shaft, said cylinder having a longitudinal section of its surface non-conductive and the balance conductive, a pair of brushes inserted in the brake-coil circuit and arranged to make continuous contact with the cylinder, a cylinder of suitable non-conductive substance secured to and adjustable on the main shaft, a strip of suitable conductive substance secured on the surface of the said cylinder longitudinally, and a pair of brushes inserted in the brake-coil circuit and arranged to make continuous contact with the said cylinder; substantially as described.

16. In a changeable sign, a sign-carrier, a main shaft in driving connection therewith, a constantly-rotating shaft, a magnetic-clutch mechanism, including a magnet-coil and an armature mounted to revolve independently of each other, and an electric circuit through the magnet-coil, a magnetic-brake mechanism, including a magnet-coil, a plunger sliding therein and an electric circuit through the magnet-coil, means for opening and closing the clutch-coil circuit, comprising a pair of contact-posts inserted in the clutch-coil circuit, a rod secured to the inner end of the brake-plunger and extending through the rear of the magnet-coil, and a connecting-bar adjustably secured to the said rod and arranged to connect and disconnect the said contact-posts with each other, and means for opening and closing the brake-coil circuit, comprising a cylinder in driving connection with the constantly-rotating shaft, said cylinder having a longitudinal section of its surface non-conductive and the balance conductive, a pair of brushes inserted in the brake-coil circuit and arranged to make continuous contact with the cylinder, a pair of contact-plates inserted in the brake-coil circuit, a switch-arm arranged to connect and disconnect these contact-plates with its movement, an arm operated by the brake-plunger to cause the switch-arm to disconnect the contact-plates, an arm secured to and turning with the main shaft to cause the switch-arm to connect the contact-plates, a cylinder of suitable non-conductive substance secured to and adjustable on the main shaft, a strip of suitable conductive substance secured to the surface of this cylinder longitudinally, and a pair of brushes inserted in the brake-coil circuit and arranged to make continuous contact with the said cylinder; substantially as described 17. In a changeable sign, a sign-carrier, a main shaft in driving connection therewith, a constantly-rotating shaft, a magnetic-clutch mechanism, including a magnet-coil and an armature mounted to revolve independently of each other, and an electric circuit through the magnet-coil, a magnetic-brake mechanism, including a magnet-coil, a plunger sliding therein and an electric circuit through the magnet-coil, means for opening and closing the clutch-coil circuit, comprising a pair of contact-posts inserted in the clutch-coil circuit, a rod secured to the inner end of the brake-plunger and extending through the rear of the magnet-coil, and a connecting-bar adjustably secured to the said rod and arranged to connect and disconnect the said contact-posts with each other, an electric-lighting circuit, a pair of contact-posts inserted in the said circuit and arranged so that the aforesaid connecting-bar will connect and disconnect them, means for opening and closing the brake-coil circuit, including a constantly-turning cylinder, a pair of brushes in constant contact therewith, a pair of contact-plates, a movable switch-arm to connect and disconnect them, a projecting arm operated by the brake-plunger and a similar arm operated by the main shaft to work the switch-arm, a cylinder secured to and adjustable on the main shaft, and a pair of brushes in constant contact therewith; substantially as described.

18. In a changeable sign, a sign-carrier, a main shaft in driving connection therewith, a constantly-rotating shaft, a magnetic-clutch mechanism for transmitting intermittent motion from the constantly-rotating shaft to the main shaft, a magnetic-brake mechanism for arresting the movement of the main shaft, magnetic-clutch circuit, a pair of contact-posts inserted in the said circuit, a lighting-circuit, a pair of contact-posts inserted in the said circuit, a connecting-bar operated by the movement of the magnetic brake, a magnetic-brake circuit, a periodic circuit-breaker for the said circuit, a switch inserted in the same circuit and operated by the movement of the magnetic brake and the main shaft, and a regulating-switch inserted in the same circuit and constructed on and operated by the turning of the main shaft; substantially as described.

In testimony whereof we have hereunto set our hands, in the presence of two subscribing witnesses, this 21st day of November, 1905.

THOMAS W. THOMAS.
GEORGE W. GILLETTE.

Witnesses:
WM. H. CHAPMAN,
S. E. KRAMER.